(12) United States Patent
Douglas et al.

(10) Patent No.: US 8,875,505 B2
(45) Date of Patent: Nov. 4, 2014

(54) INTERNAL COMBUSTION ENGINE AND METHOD FOR CONTROLLING INTERNAL COMBUSTION ENGINE SPEED

(75) Inventors: Scot A. Douglas, Howell, MI (US); Michael J. Paratore, Jr., Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 240 days.

(21) Appl. No.: 13/440,452

(22) Filed: Apr. 5, 2012

(65) Prior Publication Data
US 2013/0263576 A1    Oct. 10, 2013

(51) Int. Cl.
*F01N 3/00*    (2006.01)
(52) U.S. Cl.
USPC ............. 60/386; 60/274; 60/275; 60/300; 60/303; 180/65.1; 180/65.31; 180/65.51; 180/309

(58) Field of Classification Search
CPC . F01N 2240/16; F01N 3/2026; F01N 3/2066; F01N 3/0892; F01N 2430/02; F01N 2270/02; Y02T 90/34; B60K 13/04; B60K 7/0007

USPC ........... 60/274, 275, 286, 298, 300, 303, 320, 60/280; 180/65.1, 65.31, 65.51, 309

See application file for complete search history.

(56) References Cited

U.S. PATENT DOCUMENTS

| | | | | |
|---|---|---|---|---|
| 5,566,774 A * | 10/1996 | Yoshida | ............... | 180/65.245 |
| 5,822,983 A * | 10/1998 | Ikeda | ............... | 60/284 |
| 6,470,985 B1 * | 10/2002 | Inada et al. | ............... | 180/65.245 |
| 6,516,609 B2 * | 2/2003 | Igarashi et al. | ............... | 60/284 |
| 6,594,990 B2 * | 7/2003 | Kuenstler et al. | ............... | 60/295 |
| 7,007,460 B2 * | 3/2006 | Frieden et al. | ............... | 60/284 |
| 7,023,102 B2 * | 4/2006 | Itoh | ............... | 290/40 C |
| 7,481,207 B2 * | 1/2009 | Evans | ............... | 123/682 |

* cited by examiner

*Primary Examiner* — Binh Q Tran
(74) *Attorney, Agent, or Firm* — Cantor Colburn LLP

(57) ABSTRACT

In one exemplary embodiment of the invention a method for controlling a speed of an internal combustion engine includes shutting off fuel flow into a cylinder to reduce the speed of the internal combustion engine. The method also includes providing an electrical load to an alternator of the internal combustion engine, further reducing the speed of the internal combustion engine.

19 Claims, 1 Drawing Sheet

INTERNAL COMBUSTION ENGINE AND METHOD FOR CONTROLLING INTERNAL COMBUSTION ENGINE SPEED

FIELD OF THE INVENTION

The subject invention relates to internal combustion engines and, more specifically, to methods and systems for braking of internal combustion engines.

BACKGROUND

An engine control module of an internal combustion engine controls the mixture of fuel and air supplied to combustion chambers within cylinders of the engine. After the air/fuel mixture is ignited, combustion takes place and later the combustion gases exit the combustion chambers through exhaust valves. The combustion gases are directed by an exhaust manifold to a catalytic converter or other components of an exhaust aftertreatment system. Some engines optionally may include a forced air induction device, such as a turbocharger, that is positioned between the exhaust manifold and exhaust aftertreatment components.

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide and particulate matter. In order to reduce emissions of internal combustion engines, an exhaust gas aftertreatment system is used to reduce regulated constituents from the exhaust gas.

Exhaust gas aftertreatment systems typically include one or more aftertreatment devices, such as particulate filters, catalytic converters, mixing elements and urea/fuel injectors. Control of temperature of the exhaust gas can affect the performance of components within the exhaust system. For example, catalytic reduction devices may have to be warmed up to an operating temperature range to perform the desired catalytic reaction and thus effectively treat selected exhaust gas constituents.

In addition, a speed of a diesel engine (revolutions per minute or RPM) may be controlled by the amount of fuel injected into the cylinders for combustion. Thus, reductions in engine speed are typically achieved by reducing or shutting off fuel injection to the cylinders. After reducing fuel supply to the cylinders, air continues to flow through the cylinders and into the exhaust system, wherein the air can cause cooling of exhaust system components to temperatures below their operating temperatures.

SUMMARY OF THE INVENTION

In one exemplary embodiment of the invention a method for controlling a speed of an internal combustion engine includes shutting off fuel flow into a cylinder to reduce the speed of the internal combustion engine. The method also includes providing an electrical load to an alternator of the internal combustion engine, further reducing the speed of the internal combustion engine.

In another exemplary embodiment of the invention, an internal combustion engine includes an exhaust system configured to receive exhaust gas from the internal combustion engine and a heating device configured to heat a portion of the exhaust system. The engine also includes a control module that selectively controls an electrical load provided by the heating device to an alternator of the internal combustion engine to reduce a speed of the internal combustion engine.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
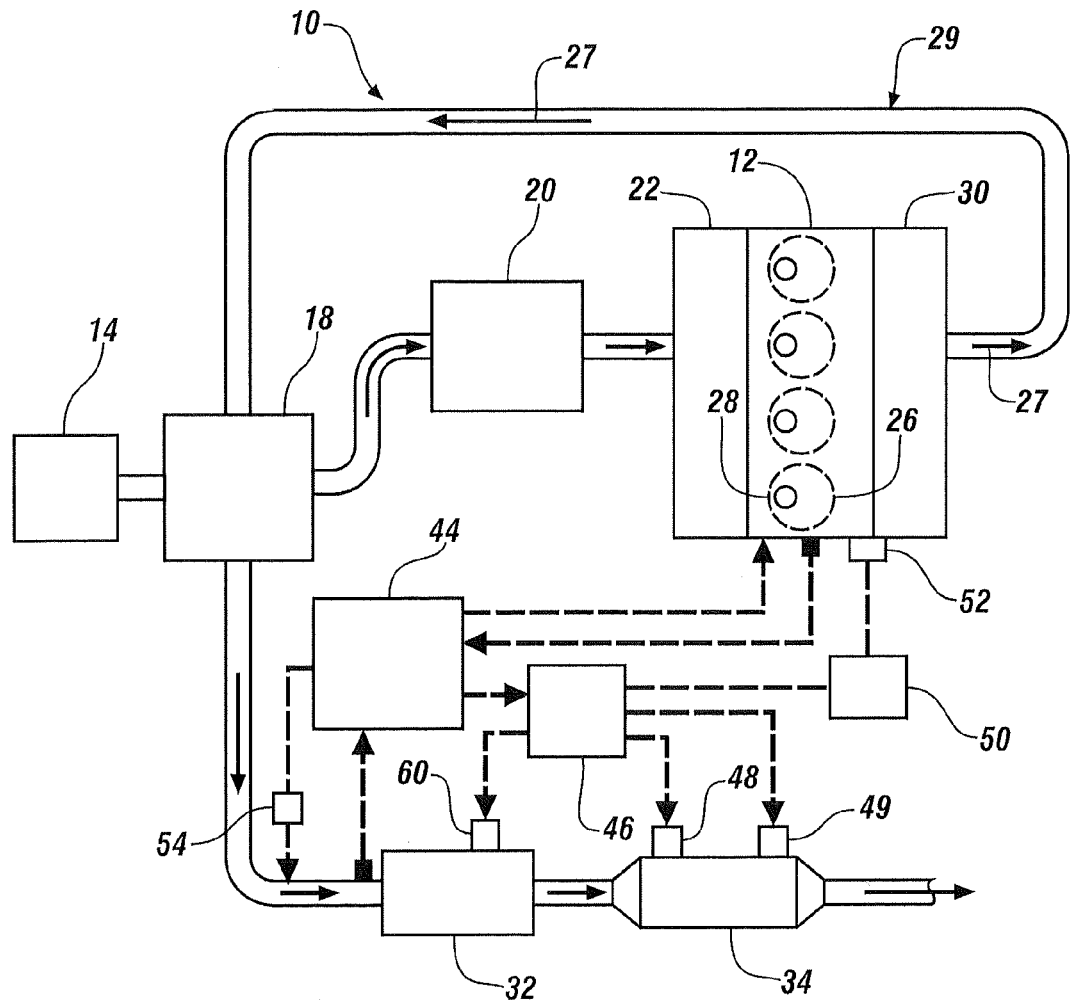
FIG. 1 is a schematic diagram of an exemplary engine system.

The following description is merely exemplary in nature and is not intended to limit the present disclosure, its application or uses. It should be understood that throughout the drawings, corresponding reference numerals indicate like or corresponding parts and features.

As used herein the term controller or control module refers to an application specific integrated circuit (ASIC), an electronic circuit, a processor (shared, dedicated or group) and memory that executes one or more software or firmware programs, a combinational logic circuit, and/or other suitable components that provide the described functionality.

In accordance with an exemplary embodiment of the invention, FIG. 1 is a schematic diagram of an exemplary engine system, such as a diesel engine system 10. The diesel engine system 10 is merely exemplary in nature and the engine control system described herein can be implemented in various engine systems implementing a heating device and particulate filter. For ease of explanation, the disclosure will be discussed in the context of a diesel engine system.

The exemplary diesel engine system 10 includes an engine 12 that combusts an air and fuel mixture to produce drive torque via a rotational output (not shown). Air enters the diesel engine system by passing through an air filter 14 and into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed to cylinders 26. Although four cylinders 26 are illustrated, it is appreciated that the systems and methods of the present invention can be implemented in engines having a plurality of cylinders including, but not limited to, 2, 3, 4, 5, 6, 8, 10 and 12 cylinders. Fuel is injected into the cylinders 26 by fuel injectors 28. Heat from the compressed air ignites the air/fuel mixture. Combustion of the air/fuel mixture creates exhaust gas 27. Exhaust gas 27 exits the cylinders 26 into the exhaust system 29.

The exhaust system 29 includes an exhaust manifold 30, an oxidation catalyst (diesel oxidation catalyst or DOC) 32, and a combination selective catalytic reduction device and particulate filter (SCR-PF) 34. Optionally, an EGR valve (not shown) re-circulates a portion of the exhaust back into the intake manifold 22. The exhaust gas 27 is directed into the turbocharger 18 to drive a turbine. The turbine facilitates the compression of the fresh air received from the air filter 14. Exhaust gas 27 flows from the turbocharger 18 through the DOC 32 and the SCR-PF 34. The DOC 32 oxidizes hydrocarbons (HC or fuel) and carbon monoxide (CO) in the exhaust gas 27 based on the post combustion air/fuel ratio. The oxidation reaction is an exothermic reaction that increases the temperature of the exhaust gas 27. The SCR-PF 34 receives exhaust from the DOC 32 and filters particulates present in the exhaust. In an embodiment, the SCR-PF 34 are separate SCR and PF components in separate canisters. In another embodiment, the SCR and PF are separate components in the same canister (SCR-PF 34), wherein the PF is downstream of the SCR. In embodiments, the exhaust system 29 may only include the PF and not include the SCR device.

A control module 44 controls the engine based on various sensed information. In an embodiment, the control module 44 controls a regeneration process for the PF. Specifically, the control module 44 estimates loading (particulate accumulation) of the SCR-PF 34 to determine when regeneration is initiated. When the estimated loading achieves a threshold level (e.g., 5 grams/liter of particulate matter) and the exhaust flow rate is within a desired range, current provided to heating devices 48 and 49 is controlled to the SCR-PF 34 via a power source 46 coupled to SCR-PF 34 to initiate the regeneration process. The duration of the regeneration process varies based upon the amount of particulate matter within the SCR-PF 34. To assist in a regeneration process, the exemplary SCR-PF 34 includes heating devices 48 and 49, such as electric coils or other suitable electrically powered heating mechanisms. In one embodiment, the exhaust system may include only one of the heating devices 48 and 49 to heat exhaust gas and/or exhaust system components. In an embodiment, the power source 46 is coupled to a plurality of exhaust system components such as the SCR-PF 34 to control a temperature of the components and improve reduction of selected constituents. In addition, in an exemplary embodiment, a suitable hydrocarbon injector (HCI) 54 is provided upstream of the DOC 32 and is configured to provide hydrocarbons in an oxidation reaction to increase exhaust gas temperature. After warm up of the engine, the DOC 32 is heated to a selected temperature by the oxidation in the DOC 32, wherein the catalytic reaction removes particulates more effectively, as compared to the DOC 32 at a lower temperature (e.g., after start up). In an embodiment, a heating device 60 may be configured to heat the DOC 32 and maintain an operating temperature for the device. The power source 46 is electrically coupled to an alternator 50 as well as heating devices 48, 49 and 60, wherein excitation of the devices provides an electrical load for the alternator 50. In operation, the alternator 50 receives mechanical output from a crankshaft 52 as a result of the combustion of air/fuel mixture within the cylinders 26. In an embodiment, the mechanical output from the crankshaft 52 is converted to electrical energy by the alternator 50 to provide electrical power to run various devices, such as the power source 46.

In an embodiment, the control module 44 controls an amount of current sent from the power source 46 to heating devices 48, 49 and 60, wherein the heating devices 48, 49 and 60 provide an electrical load when they are placed on a circuit with the alternator 50. In a scenario where the control module 44 determines that the engine 12 speed is to be reduced (i.e., lower revolutions per minute), such as when a vehicle enters a downgrade or downhill road, the control module 44 causes the power source 46, heating devices 48 and/or 49 to place an electrical load on the alternator 50. The electrical load of the power source 46 heating the heating device 48 and/or 49 on by the alternator 50, places a load on the engine 12 via the crankshaft 52. Thus, the control module 44 provides engine braking or speed reduction by adding the parasitic electrical load, via the alternator 50, caused by heating the SCR-PF 34 using heating devices 48 and/or 49. It should be noted that the heating devices 48, 49 and 60 may be integrated in their respective components, such as coils embedded in the canisters, or may be a separate module associated with the exhaust system 29. Further, the heating devices 48, 49 and 60 may be configured to heat the components or the exhaust gas entering the components, wherein the heating process provides improved aftertreatment component performance. For example, the heating devices 48 and 49 are configured to heat the SCR and/or PF portion of the SCR-PF 34 at or above an operating temperature of about 250 degrees Celsius. In another embodiment, the heating devices 48 and 49 are configured to heat the SCR and/or PF portion of the SCR-PF 34 to about 300 degrees Celsius. In an embodiment, the heating device 60 is configured to heat the DOC 32 to an operating temperature of about 200 to about 400 degrees Celsius.

During an exemplary speed reduction or deceleration, a flow of fuel to the cylinders 26 may be stopped while air continues to flow into and from the cylinders 26, wherein the air comprises a portion of the exhaust gas sent from the cylinders to exhaust system components. Due to the air flowing from the cylinders 26, the temperature of the exhaust gas during deceleration is lower than the exhaust gas temperature during normal operation (i.e., when fuel and air are combusted in cylinders 26). In embodiments, exhaust system components, such as DOC 32 and SCR-PF 34, reduce pollutants from the exhaust gas more effectively at elevated operating temperatures where the components are effective in removing constituents from the exhaust gas. In an embodiment, the heating devices 48, 49 and 60 heat exhaust system components that are cooled by uncombusted exhaust gas during deceleration. In an embodiment, the depicted arrangement for heating exhaust gas 27 may improve removal of exhaust gas constituents in cases where normal operation (i.e., air-fuel combustion) resumes after deceleration. Accordingly, the exemplary system and method control the temperature of one or more components, such as the DOC 32 and SCR-PF 34, during deceleration to improve system operation following deceleration.

Figure 2:
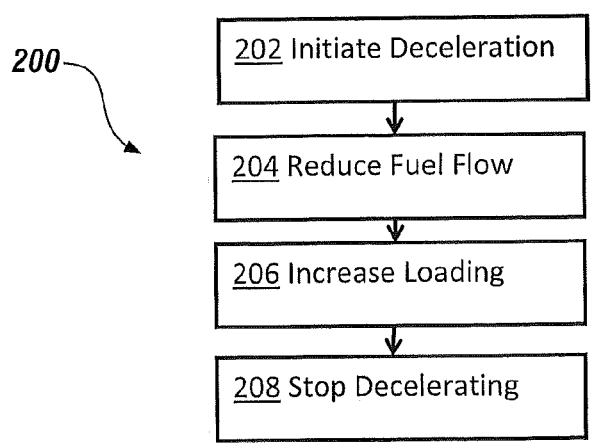
FIG. 2 is a flow chart of exemplary steps to control an engine speed.

FIG. 2 is a flow chart 200 of exemplary steps to control an engine speed, such as the engine 10 shown in FIG. 1. In block 202, the deceleration of the engine speed is initiated. In block 204, fuel flow to the engine 10 is reduced or shut off, thereby slowing or stopping air-fuel combustion in the engine. In an example, a vehicle enters a decline or down slope where the operator decelerates engine speed (RPMs) to control the vehicle speed. In block 206, one or more heating devices in the exhaust system are heated (or "activated") to provide an electrical load to the alternator, thereby adding a load to the engine to further reduce the engine speed. In block 208, the engine deceleration is stopped and "normal" engine operation (including combustion of fuel-air in cylinders) resumes, wherein the heating device(s) maintained the temperature of one or more exhaust system components during deceleration to ensure the components effectively operated following deceleration and return to normal engine operation.

The amount of energy or power "drag" or "drain" provided to the engine by the electrical load from the heating devices 48 and/or 49 heating the SCR-PF 34 and/or exhaust gas may be described by the following equation, $$Q = m \cdot C_P \cdot \Delta T \tag{1}$$

wherein the following values relate to exhaust gas at the selected location: Q=energy needed to heat exhaust gas (i.e., load), m=mass flow rate of exhaust gas, $C_p$=specific heat capacity of the exhaust gas and $\Delta T$=temperature rise of the exhaust gas. In an example, about 2.5 kilowatts are provided as a load to an 8-cylinder diesel engine by the exemplary electrical load speed control method and system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling a speed of an internal combustion engine, the method comprising:
    shutting off fuel flow into a cylinder to reduce the speed of the internal combustion engine;
    providing an electrical load to an alternator of the internal combustion engine, further reducing the speed of the internal combustion engine, wherein providing the electrical load comprises exciting a heating device coupled to the alternator to heat a portion of an exhaust system configured to receive exhaust gas from the cylinder; and
    controlling the electrical load such that the heating device maintains an operating temperature of at least one exhaust system component while the speed of the internal combustion engine is reduced.

2. The method of claim 1, comprising directing an air flow into the cylinder, wherein the air flow forms at least a portion of the exhaust gas received by the exhaust system.

3. The method of claim 2, wherein the portion of the exhaust system heated by the heating device comprises a selective catalytic reduction device cooled by the exhaust gas.

4. The method of claim 1, wherein the heating device maintains an operating temperature of about 250 degrees Celsius within at least one exhaust system component while the speed of the internal combustion engine is reduced.

5. The method of claim 4, wherein the at least one exhaust system component comprises a selective catalytic reduction device or an oxidation catalyst.

6. The method of claim 1, wherein providing the electrical load to the alternator slows rotation of a crankshaft coupled to the alternator and increases a parasitic load on the internal combustion engine during a braking operation.

7. An internal combustion engine, comprising:
    an exhaust system configured to receive exhaust gas from the internal combustion engine;
    a heating device configured to heat at least one exhaust system; component of the exhaust system; and
    a control module that selectively controls an electrical load provided by the heating device to an alternator of the internal combustion engine to reduce a speed of the internal combustion engine and maintains an operating temperature of the at least one exhaust system component while the speed of the internal combustion engine is reduced.

8. The internal combustion engine of claim 7, wherein the cylinder is configured to receive an air flow that forms at least a portion of the exhaust gas received by the exhaust system.

9. The internal combustion engine of claim 8, wherein the at least one exhaust system component comprises at least one component cooled by the exhaust gas.

10. The internal combustion engine of claim 9, wherein the at least one component comprises the selective catalytic reduction device.

11. The internal combustion engine of claim 7, wherein the heating device maintains an operating temperature of about 250 degrees Celsius within at least one exhaust system component while the speed of the internal combustion engine is reduced.

12. The internal combustion engine of claim 11, wherein the at least one exhaust system component comprises a selective catalytic reduction device or an oxidation catalyst.

13. The internal combustion engine of claim 7, wherein the electrical load provided to the alternator slows rotation of a crankshaft coupled to the alternator and increases a parasitic load on the internal combustion engine during a braking operation.

14. A method for controlling an internal combustion engine, the method comprising:
    determining a reduction of the speed of the engine is needed; and
    exciting a heating device coupled to an alternator of the internal combustion engine, thereby increasing a parasitic load on the engine causing a reduced speed for the internal combustion engine, wherein said exciting a heating device is performed so as to heat a portion of an exhaust system configured to receive exhaust gas from the cylinder; and
    controlling an electrical current supplied to the heating device such that the heating device maintains an operating temperature of at least one exhaust system component while the speed of the internal combustion engine is reduced.

15. The method of claim 14, wherein the heating device is configured to heat a portion of an exhaust system configured to receive exhaust gas from the cylinder.

16. The method of claim 15, comprising directing an air flow into the cylinder, wherein the air flow forms at least a portion of the exhaust gas received by the exhaust system.

17. The method of claim 16, wherein the portion of the exhaust system heated by the heating device comprises at least one component cooled by the exhaust gas while a speed of the engine is reduced.

18. The method of claim 17, wherein the heating device maintains an operating temperature of about 250 degrees Celsius within the at least one component.

19. The method of claim 18, wherein the at least one component comprises a selective catalytic reduction device or an oxidation catalyst.

* * * * *